Figure 1:
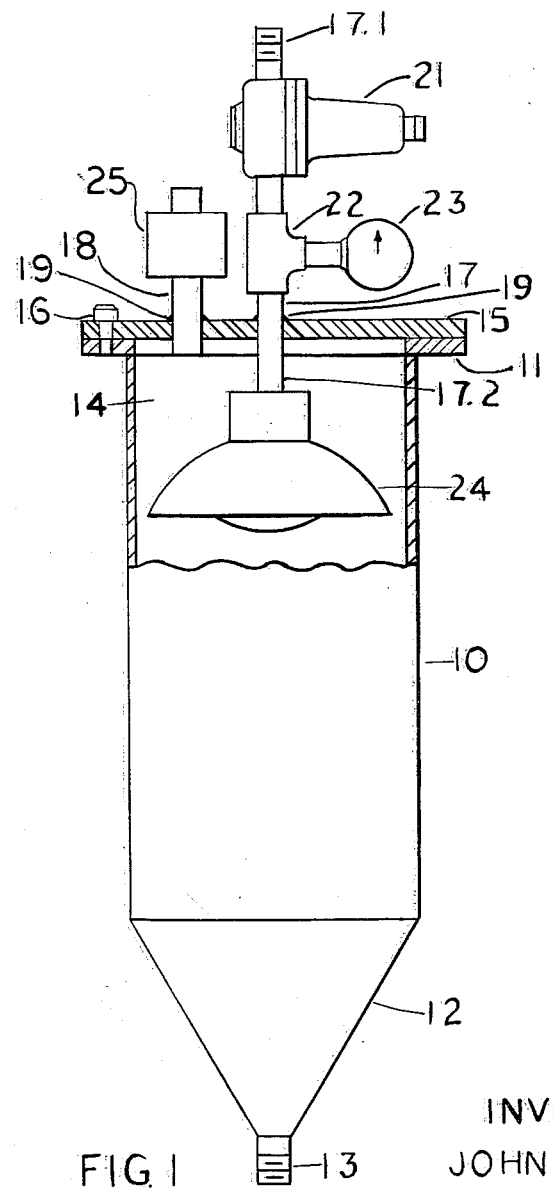

INVENTORS
JOHN R. BERGER
STANLEY R. RICH
ATTORNEY

Feb. 16, 1965     J. R. BERGER ETAL     3,169,561
DEFOAMING SYSTEM

Filed Feb. 14, 1962     3 Sheets-Sheet 3

INVENTORS
JOHN R. BERGER
STANLEY R. RICH

BY *Alfred H Rosen*
ATTORNEY

United States Patent Office 3,169,561
Patented Feb. 16, 1965

3,169,561
DEFOAMING SYSTEM
John R. Berger and Stanley R. Rich, West Hartford, Conn., assignors, by mesne assignments, to Northern Industries, Inc., Dover, Del., a corporation of Delaware
Filed Feb. 14, 1962, Ser. No. 173,239
11 Claims. (Cl. 141—69)

This invention relates to defoaming systems, and more particularly to systems for breaking foam formed during the filling of liquid containers.

As is well known, many liquids produce foam when poured into a container. For this reason, when a tank or a drum is filled with such a liquid, it is necessary to accept one or more undesirable conditions, as follows:

(1) Slow the filling rate as the liquid approaches the top of the container;
(2) Permit the liquid to overflow and carry the foam out of the container;
(3) Fill the container only partially.

It is the principal object of our present invention to remove completely, or at least drastically curtail, the necessity to accept any of these undesirable conditons. In general, the present invention has the objective to provide a defoaming system which will enable containers, such as tanks and drums, to be filled with liquids, which normally produce foam when poured, at speeds which are the same as though no foam were normally produced, without overflow of foam; and which further enable such containers to be filled to the top in a minimum time which is determined substantially exclusively by the pouring rate of the liquid involved. Additional objects of the invention are to provide such a defoaming system embodied in apparatus which is durable and portable, and can readily be transferred from one container to another, and which will take advantage of the latest developments in defoaming techniques. Another object of the invention is to provide such defoaming apparatus which uses elastic wave energy to break foam, and which has no electrical or moving parts, and can be used freely in all environments without generating any explosion hazard, or introducing any chemical agent into the liquid being handled.

According to the invention in one of its general aspects there is provided a system for breaking foam formed during the filling of liquid containers comprising, envelope means providing a chamber having a vent to the atmosphere in its upper portion, conduit means leading vertically from the bottom of said chamber for coupling said chamber with the top of a liquid container, so that when said chamber is coupled with a liquid container during filling thereof foam may rise into said chamber from said container, and means in said chamber to break foam, whereby defoamed liquid may be returned to said container via said conduit means.

According to the invention in one of its more specific aspects, there is provided a system for breaking foam during the filling of liquid containers comprising, envelope means providing a chamber having a vent to the atmosphere in its upper portion, first conduit means leading vertically from the bottom of said chamber for coupling said chamber with the top of a liquid container so that when said chamber is coupled with a liquid container during filling thereof foam may rise into said chamber from said container, second conduit means thinner than said first conduit means passing through said envelope means and within said first conduit means for filling said container, and means in said chamber to break foam, whereby defoamed liquid may be returned to said container via said first conduit means.

Figure 2:
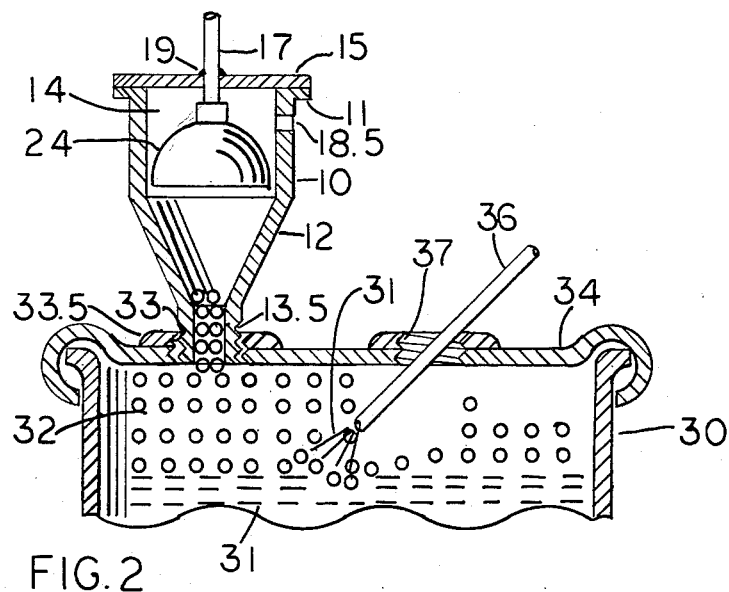
Figure 3:
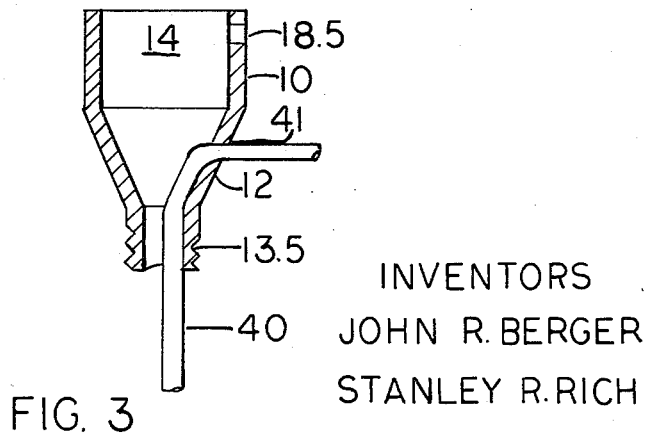
Figure 4:
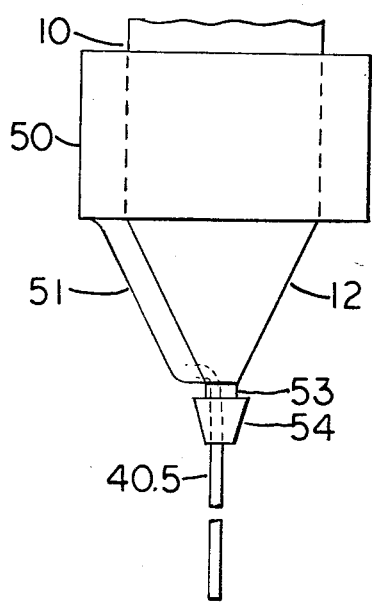
Figure 5:
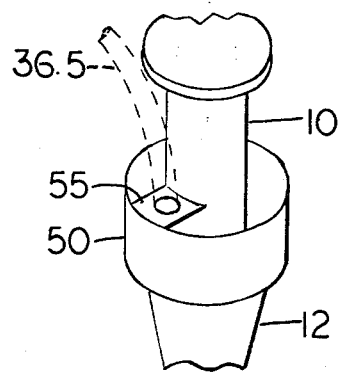

The foregoing and other objects and features of the invention will be better appreciated from the following description of certain embodiments of the invention. This description refers to the accompanying drawings, wherein:

FIG. 1 is a side view, partially in section, of a defoaming system according to the invention;
FIG. 2 illustrates the application of the invention in the filling of a drum;
FIG. 3 is a side-sectional view of a part of another embodiment of the invention;
FIG. 4 is a side view of a modified embodiment of the invention as illustrated in FIG. 3; and
FIG. 5 is another view of the embodiment of FIG. 4.

Referring to FIG. 1, a hollow vertical cylinder 10 forming a chamber 14 has a flange 11 at the top and a conically-tapered section 12 connected to it at the bottom; the tapered section 12 terminates at its bottom in an externally-threaded pipe 13. A cap 15 is fastened to the flange 11, as by means of bolts 16, of which only one is illustrated. The cap has two pipes 17 and 18 passing through it, and fastened to it as by welding 19 at the meeting surfaces, which also may hermetically seal each pipe in and through the cap. The first pipe 17 is externally threaded at its outer or free end 17.1 for attachment to a source of compressed air or other gas (not shown). Between the outer end 17.1 of the first pipe and the cap 15 there are, as shown in FIG. 1, a pressure reducing or regulating valve 21 and a T-joint 22 having a pressure gauge 23 in its side arm. A generator 24 of elastic wave energy in gas, of a type which generates such energy when supplied with compressed air or other gas, is fitted to the inner end 17.2 of the first pipe, and is thereby supported within the chamber 14, in the upper portion of the cylinder 10. Generators suitable for this purpose are described in the copending application of Stanley R. Rich, Serial No. 117,015 filed June 14, 1961 and assigned to the same assignee as the present application. The second pipe 18 provides a vent to the atmosphere, and may be fitted with an acoustic muffler 25, if desired.

FIG. 2 shows a defoamer according to FIG. 1 in use with a drum 30 being filled with a liquid 31 which produces foam 32 during the filling operation. The defoamer shown in FIG. 2 includes the chamber 14 within the cylinder 10 and tapered section 12, the elastic wave generator 24 and feed pipe 17 supported in the cap 15 mounted on the flange 11. Auxiliary parts such as the pressure reducing valve, pressure gauge and muffler are omitted from FIG. 2 to avoid unnecessary repetition, but it will be understood that these parts may be included in practice. For simplicity, a vent 18.5 is shown in place of the vent pipe 18 in FIG. 1. The threaded pipe 13.5 at the bottom of the tapered section is shown threaded into an internally threaded port 33 in the top 34 of the drum. Such ports may have a collar 33.5 for strength. In any event, the defoamer may be supported directly on the top 34 of the drum in this manner, or as illustrated in FIG. 4 and to be described below. A filler hose or pipe 36 passes through a second port 37 in the top 34. Preferably this port is stoppered, as with a cork (not shown) through which the hose 36 passes, preventing foam from backing out through the filler port 37.

During filling of the drum 30 the liquid 31 pours out of the hose 36 and moves in a direction away from the hose, which is downward, as shown in FIG. 2. Obviously, the hose 36 may be inserted at any angle. Foam 32 which is formed during the filling operation is pushed away from the hose by the incoming liquid, but rises on top of the liquid 31, where it eventually fills a substantial portion of the upper part of the tank. At this point it has heretofore been necessary to make choices among the three alternatives mentioned above. Now, however, according to the present invention, the foam 32 is forced to rise into the chamber 14 of the defoamer. This is easily possible since the chamber 14 is vented to the atmosphere through the vent opening 18.5. Foam in the defoamer is broken by elastic wave energy provided by the generator 24, and the resulting defoamed liquid (not shown) simply falls through the pipe 13.5 back into the drum 30. The vent 18.5 serves also to permit gas from the feed pipe 17 to escape into the atmosphere.

Thus we have provided a system for breaking foam formed during the filling of liquid containers comprising, envelope means providing a chamber having a vent to the atmosphere in its upper portion, conduit means leading vertically from the bottom of said chamber for coupling said chamber with the top of a liquid container, so that when said chamber is coupled with a liquid container during filling thereof foam may rise into said chamber from said container, and means in said chamber to break foam, whereby defoamed liquid may be returned to said container via said conduit means. If the elastic wave energy being employed has a frequency in the audible range, a muffler may be used, as indicated in FIG. 1, to reduce annoyance to nearby personnel. As is stated in the aforementioned application of Rich, elastic wave generators may be provided which generate elastic waves at intensity levels up to approximately 1 watt/cm.$^2$, and these may be operated with gas at pressures varying between approximately 1 p.s.i. and 70 p.s.i. (excess, or gauge, pressure).

The defoamer need not be supported directly from the top 34 of the drum 30. If desired, the defoamer may be separately supported (by means not shown) and a pipe or hose longer than the short nipple 13 or 13.5 may be connected between the lower opening into the conical section 12 and the top of the drum. Further, in such a case, the lower section of the defoamer may be cylindrical, as the upper section 10. It is only necessary to provide that foam rising in the drum shall rise into the chamber 14 where the foam can be broken by elastic wave energy, and the resulting liquid then returned to the drum 30. Further, the chamber 14 need not be cylindrical, but may have another shape, such as rectangular. The chamber 14 will serve to concentrate elastic wave energy from the generator 24, as is explained in the copending application of Stanley R. Rich, Serial No. 155,989 filed November 30, 1961 and assigned to the same assignee as the present application. It will also be appreciated that the cap 15 may be omitted, in some cases, if desired, and a chamber 14 which is open at the top, like a funnel, may be used, in which case other means (not shown) may be used to support the generator 24 in or near the top of the chamber.

FIG. 3 shows a system which may be used in cases where the container has only one port in its top. A filler tube 40 passes through a hole 41 in the side of the tapered section 12 of the chamber 14 and downward through the bottom pipe 13.5. The filler tube is smaller in outer diameter than the inner diameter of the bottom pipe 13.5. The embodiment of FIG. 3 is otherwise like the embodiments of FIGS. 1 and 2; parts which are identical in both embodiments have been omitted from FIG. 3. The defoamer according to FIG. 3 is used in the same manner as the defoamer according to FIG. 2, except that liquid is passed via the tube 40 into the container being filled. Since the container has only one port (or only one open port), the only vent for the container is via the defoamer vent 18.5. Therefore any foam which is formed during the filling must rise into the chamber 14, where the elastic wave generator breaks the foam. Defoamed liquid will then return to the container via the bottom pipe 13.5 of the defoamer.

FIGS. 4 and 5 show a modification of the embodiment of FIG. 3, which includes a plenum chamber 50 surrounding the cylinder 10. A pipe 51 leads from the bottom of the plenum chamber 50 downwardly along the outer surface of the tapered section 12; this pipe passes through the wall of the tapered section 12 at or near its junction with the bottom pipe 53, and then continues downwardly through and beyond the bottom pipe 53 as a vertical tube 40.5, which corresponds with the lower portion of the filler tube 40 in FIG. 3. The plenum chamber is open at the top. Conveniently, it has a guide 55 for a filler hose 36.5, shown with dashed lines in FIG. 5. The bottom pipe 53 is fitted with a conical sealing member 54 made of a resilient material, such as neoprene or Teflon, as an alternative for the threaded fitting of the pipe 13 in FIG. 1, for example.

The plenum chamber enables the filling of a container to be carried beyond the point where foam would normally block further filling, by storing a quantity of the filling liquid in the plenum chamber. Thus, as the defoaming action breaks foam, the stored liquid moves down into the container. In this way, a liquid which foams readily can be quickly forced into a container and a quantity which will complete filling of the containers can be left in the plenum chamber, to fall into the container very shortly thereafter when the foam is gone. Thus, an operator performing filling operations need not pay further attention to this particular container.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. System for breaking foam formed during the filling of liquid containers of the type represented by totally-enclosed drums, tanks and the like, having at least one sealable relatively small port for filling and/or draining the same, said system embodied in a unitary portable device comprising, envelope means providing a chamber having a vent to the atmosphere in its upper portion, conduit means leading vertically from the bottom of said chamber for detachably temporarily coupling said chamber with the top of a liquid container of said type via one such port in place of the sealing means normally provided therefor, so that when said chamber is coupled with such a liquid container during filling thereof foam may rise into said chamber from said container, and means in said chamber to break foam, whereby defoamed liquid may be returned to said container via said conduit means.

2. System for breaking foam formed during the filling of liquid containers of the type represented by totally-enclosed drums, tanks and the like, having at least one sealable relatively small port for filling and/or draining the same, said system embodied in a unitary portable device comprising, envelope means providing a chamber having a vent to the atmosphere in its upper portion, first conduit means leading vertically from the bottom of said chamber for detachably temporarily coupling said chamber with the top of a liquid container of said type via one such port in place of the sealing means normally provided therefor so that when said chamber is coupled with such a liquid container during filling therof foam may rise into said chamber from said container, second conduit means thinner than said first conduit means passing through said envelope means and within said first conduit means for filling said container through the same said port, and means in said chamber to break foam, whereby defoamed liquid may be returned to said container via said first conduit means.

3. System for breaking foam formed during the filling of liquid containers of the type represented by totally-enclosed drums, tanks and the like, having at least one sealable relatively small port for filling and/or draining the same, said system embodied in a unitary portable device comprising, envelope means providing a chamber having a vent to the atmosphere in its upper portion, conduit means leading vertically from the bottom of said chamber for detachably temporarily coupling said chamber with the top of a liquid container of said type via one such port in place of the sealing means normally provided therefor so that when said chamber is coupled with such a liquid container during filling thereof foam may rise into said chamber from said container, and means to provide elastic wave energy in said chamber to break foam, whereby defoamed liquid may be returned to said container via said conduit means.

4. System for breaking foam formed during the filling of liquid containers of the type represented by totally-enclosed drums, tanks and the like, having at least one sealable relatively small port for filling and/or draining the same, said system embodied in a unitary portable device comprising, envelope means providing a chamber having a vent to the atmosphere in its upper portion, conduit means leading vertically from the bottom of said chamber for detachably temporarily coupling said chamber with the top of a liquid container of said type via one such port in place of the sealing means normally provided therefor so that when said chamber is coupled with such a liquid container during filling thereof foam may rise into said chamber from said container, and means to generate elastic wave energy in a gaseous medium disposed in the upper portion of said chamber, to break foam and return defoamed liquid to said container via said conduit means.

5. System for breaking foam formed during the filling of liquid containers of the type represented by totally enclosed drums, tanks and the like, having at least one sealable relatively small port for filling and/or draining the same, said system embodied in a unitary portable device comprising, in combination, a liquid container having a top, a port through said top, envelope means providing a chamber having a vent to the atmosphere in its upper portion, conduit means leading vertically from the bottom of said chamber and detachably coupled to said port and so arranged that during filling of said container foam may rise into said chamber from said container, and means in said chamber to break foam, whereby defoamed liquid may be returned to said container via said conduit means.

6. System for breaking foam formed during the filling of liquid containers of the type represented by totally-enclosed drums, tanks and the like, having at least one sealable relatively small port for filling and/or draining the same, said system embodied in a unitary portable device comprising, in combination, a liquid container having a top, a filler port through said top, envelope means providing a chamber having a vent to the atmosphere in its upper portion, first conduit means leading vertically from the bottom of said chamber and detachably coupled to said port and so arranged that during filling of said container foam may rise into said chamber from said container, second conduit means passing through said port for filling said container, and means in said chamber to break foam, whereby defoamed liquid may be returned to said container via said first conduit means.

7. System for breaking foam formed during the filling of liquid containers of the type represented by totally-enclosed drums, tanks and the like, having at least one sealable relatively small port for filling and/or draining the same, said system embodied in a unitary portable device comprising, envelope means providing a generally upright chamber having a vent to the atmosphere in its upper portion, the lower portion of said envelope means tapering into downwardly extending conduit means leading from the bottom of said chamber for detachably temporarily coupling said chamber with the top of a liquid container of said type via one such port in place of the sealing means normally provided therefor so that when said chamber is coupled with such a liquid container during filling thereof foam may rise into said chamber from said container, and means to provide elastic wave energy in said chamber to break foam, whereby defoamed liquid may be returned to said container via said conduit means.

8. System for breaking foam formed during the filling of liquid containers of the type represented by totally-enclosed drums, tanks and the like, having at least one sealable relatively small port for filling and/or draining the same, said system embodied in a unitary portable device comprising, envelope means providing a generally upright chamber having a vent to the atmosphere in its upper portion, the lower portion of said envelope means tapering into downwardly extending conduit means leading from the bottom of said chamber for detachably temporarily coupling said chamber with the top of a liquid container of said type via one such port in place of the sealing means normally provided therefor so that when said chamber is coupled with such a liquid container during filling thereof foam may rise into said chamber from said container, a filler conduit affixed to said envelope and conduit means and extending from a point above said conduit means to a point below said conduit means for filling said container through the same said port when said chamber is coupled thereto, and means to provide elastic wave energy in said chamber to break foam, whereby defoamed liquid may be returned to said container via said conduit means.

9. System for breaking foam formed during the filling of liquid containers of the type represented by totally-enclosed drums, tanks and the like, having at least one sealable relatively small port for filling and/or draining the same, said system embodied in a unitary portable device comprising, envelope means providing a generally upright chamber having a vent to the atmosphere in its upper portion, the lower portion of said envelope means tapering downwardly to a conduit pipe leading from the bottom of said chamber and fitted at its lower end for detachable temporary substantially liquid-tight coupling with the top of a liquid container, of said type via one such port in place of the sealing means normally provided therefor, and means to provide elastic wave energy in said chamber to break foam, whereby when said chamber is coupled with such a liquid container during filling thereof foam may rise into said chamber from said container through said conduit pipe and defoamed liquid may be returned to said container via said conduit pipe.

10. System for breaking foam formed during the filling of liquid containers of the type represented by totally-enclosed drums, tanks and the like, having at least one sealable relatively small port for filling and/or draining the same, said system embodied in a unitary portable device comprising, envelope means providing a generally upright chamber having a vent to the atmosphere in its upper portion, the lower portion of said envelope means tapering downwardly to a conduit pipe leading from the bottom of said chamber and fitted at its lower end for detachable temporary substantially liquid-tight coupling with the top of a liquid container of said type via one such port in place of the sealing means normally provided therefor, a filler pipe of smaller diameter than said conduit pipe extending from a point outside said envelope means above said conduit pipe through said conduit pipe to a point below said lower end thereof, and means to provide elastic wave energy in said chamber to break foam, whereby when said chamber is coupled with such a liquid container during filling thereof foam may rise into said chamber from said container through said conduit pipe and defoamed liquid may be returned to said container via said conduit pipe.

11. System for breaking foam formed during the filling of liquid containers of the type represented by totally-enclosed drums, tanks and the like, having at least one sealable relatively small port for filling and/or draining the same, said system embodied in a unitary portable device comprising, envelope means providing a generally upright chamber having a vent to the atmosphere in its upper portion, the lower portion of said envelope means tapering downwardly to a conduit pipe leading from the bottom of said chamber and externally threaded at its lower end for detachable temporary engagement within an internally threaded access aperture in the top of a liquid container of said type via one such port in place of the sealing means normally provided therefor, and means to provide elastic wave energy in said chamber to break foam, whereby when said chamber is coupled with such a liquid container during filling thereof foam may rise into said chamber from said container through said conduit pipe and defoamed liquid may be returned to said container via said conduit pipe.

References Cited by the Examiner

UNITED STATES PATENTS

| 1,560,286 | 11/25 | Mount | 252—361 |
| 1,935,235 | 11/33 | Willmann | 252—361 |
| 2,800,100 | 7/57 | Boucher | 116—137 |

FOREIGN PATENTS 80,749  9/52  Norway.

OTHER REFERENCES

Publication: "Chemical Processing," February, 1959, 252–361 (Air Jet Generator—Defoaming Problems).

LAVERNE D. GEIGER, *Primary Examiner.*